United States Patent [19]

Rhodes

[11] Patent Number: 4,994,899
[45] Date of Patent: Feb. 19, 1991

[54] FREQUENCY GENERATION FOR EXTENDED BANDWIDTH MAC COLOR TELEVISION ENCODING AND DECODING

[75] Inventor: Charles W. Rhodes, South Salem, N.Y.

[73] Assignee: Scientific Atlanta, Inc., Atlanta, Ga.

[21] Appl. No.: 172,279

[22] Filed: Mar. 23, 1988

[51] Int. Cl.[5] .................... H04N 11/10; H04N 11/00; H04N 7/93
[52] U.S. Cl. ....................................... 358/11; 358/12; 358/14; 358/146
[58] Field of Search ....................... 358/11, 12, 13, 14, 358/146

[56] References Cited
U.S. PATENT DOCUMENTS 4,652,903  3/1987  Lucas ..................................... 358/11
4,866,522  9/1989  Beckley ............................... 358/145

Primary Examiner—John W. Shepperd
Attorney, Agent, or Firm—Banner, Birch, McKie & Beckett

[57] ABSTRACT

In a Multiplexed Analog Component (MAC) color television transmission system in which the MAC signal is to be converted at the receiver to a composite color television signal having a 227.5 $f_H$ color subcarrier, frequency-generation equipment required at the receiver is simplified, and bandwidth is extended, by selecting the various frequencies in accordance with the following relationship:

$$f_0 = 3f_1 = 3f_2 = 2f_4 = 1365k\, f_H$$

where:
$f_0$ is the master clock frequency,
$f_1$ is the luminance samping frequency,
$f_2$ is the chrominance sampling frequency,
$f_4$ is the MAC sampling frequency,
$f_H$ is the horizontal line frequency, and
k is a positive integer greater than 2.
$f_3$ is the data clock frequency which is independent of k and remains fixed at its present value.

For MAC receivers designed for C, D or C/2 standards, the relationship becomes $$f_0 = 3f_1 = 6f_2 = 2f_4 = 1296k\, f_H$$

where the symbols have the same meaning as above. $f_3$ is the data clock frequency which is independent of k and fixed at 1296 $f_H$ for the present C, D-MAC standards and 648 $f_H$ for the present D/2-MAC standards.

66 Claims, 5 Drawing Sheets

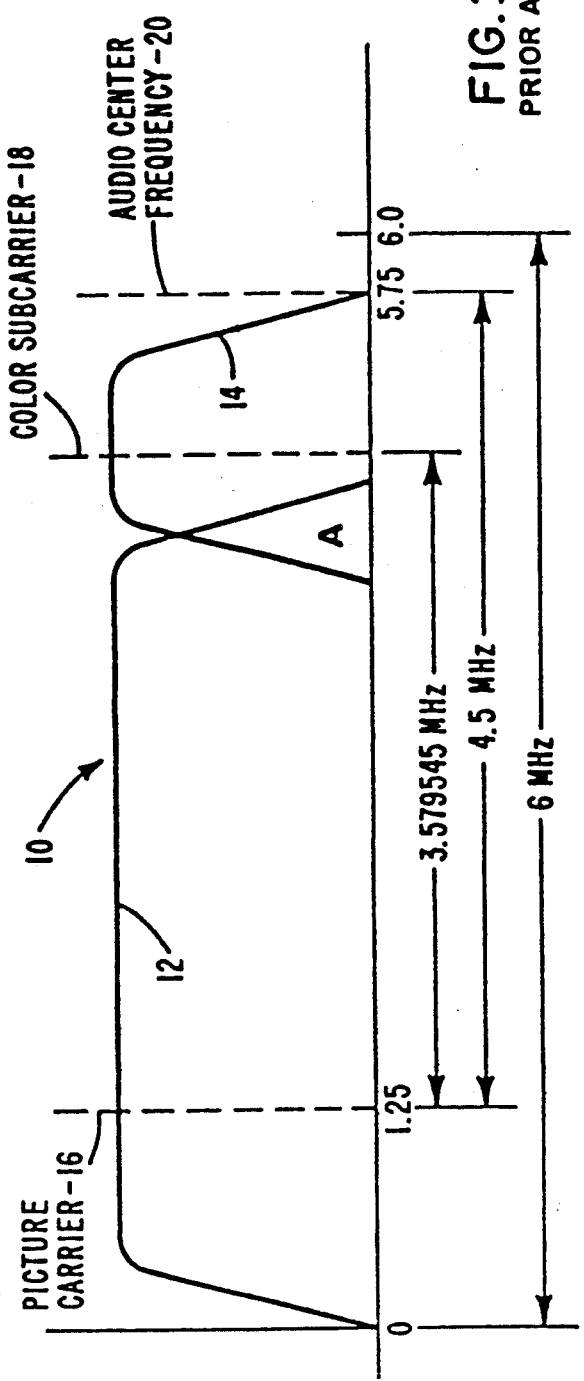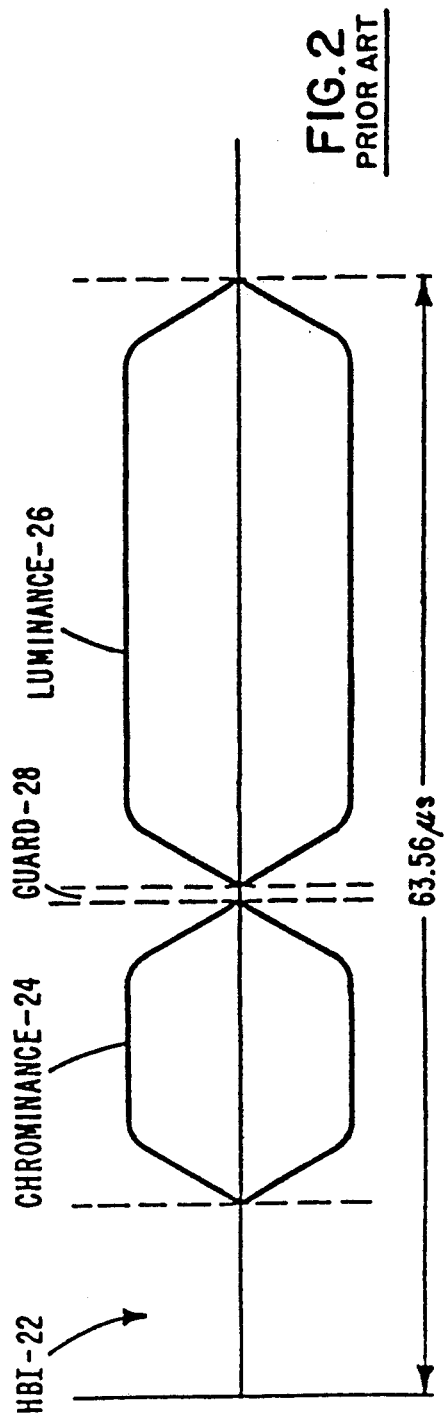

FREQUENCY GENERATION FOR EXTENDED BANDWIDTH MAC COLOR TELEVISION ENCODING AND DECODING

BACKGROUND OF THE INVENTION

1. Technical Field

The present invention is directed to the encoding and decoding of Multiplexed Analog Components (MAC) color television signals. More specifically, the present invention is directed to the frequency generation for MAC color television encoding and decoding.

2. Background Information

Composite color television signals, as is well known to those skilled in the art, are those signals wherein the chrominance (i.e., color) information is carried on a subcarrier and is transmitted along with the luminance (i.e., brightness) information. In the United States, color broadcasts are made according to National Television Systems Committee (NTSC) standards. Other composite signals include SECAM, which is used in France, and PAL, which predominates in the rest of Europe.

FIG. 1 shows a radio frequency amplitude vs. frequency diagram where the NTSC signal amplitude modulates an RF carrier and is filtered to vestigal sideband amplitude modulation as for terrestrial broadcasting under FCC rules. A typical NTSC composite color television signal is shown, and includes luminance signal 12 and chrominance signal 14. The signal occupies a nominal radio frequency bandwidth of 6 MHz with picture carrier 16 being 1.25 MHz above the lower end of the band. Luminance information is amplitude modulated directly onto the picture carrier. Chrominance information is modulated onto color subcarrier 18 which is, in turn, used to modulate the picture carrier, while audio information is modulated on subcarrier 20. The color subcarrier has a frequency of 3.579545 MHz, a standard established by the NTSC. The lower chrominance sideband and portions of the lower sideband of luminance are suppressed, not transmitted.

It has long been recognized that composite color television signals have problems associated with their structure. For example, the overlap of chrominance and luminance information in region A leads to problems since separation of luminance and chrominance is accomplished by filtering the frequency-division multiplexed signal. If, upon reception, complete separation between luminance and chrominance is desired, the necessary filtering will cause the loss of some of the information can be tolerated, then one must accept interference between the luminance and chrominance signals. Moreover, since the various parts of the NTSC television signal are transmitted at different frequencies, non-uniform amplitude/frequency response occurring in transmission will affect them differently, causing the signal to deteriorate. Also, the available color information is severely limited by the small color bandwidth permitted by the choice of color subcarrier.

The Multiplexed Analog Components (MAC) color television signal was developed to overcome the problems inherent with composite color television systems. Turning now to FIG. 2, an amplitude-vs.-time diagram of a MAC video line is shown, and includes horizontal blanking interval (HBI) 22, chrominance information 24 and luminance information 26 (either or both of which may be time-compressed), the latter being separated by guard interval 28 to assist in preventing interference between the two signals.

The MAC color television signal is obtained by generating conventional luminance and chrominance signals (as would be done to obtain a conventional NTSC or other composite color television signal) and them sampling and storing these signals separately. Luminance is sampled at a luminance sampling frequency and stored in a luminance store, while chrominance is sampled at a chrominance sampling frequency and stored in a chrominance store. The luminance and chrominance samples may then be compressed in time by first writing them into the store in their individual sampling frequency and reading them from the store at a higher frequency. A multiplexer selects either the luminance store or the chrominance store, at the appropriate time during the active video line, for reading, thus creating the MAC signal of FIG. 2. If desired, audio samples may be transmitted during the HBI; these are multiplexed (and may be compressed) in the same manner as the video samples. The single rate at which all samples occur in the multiplexed MAC signal is called the MAC sampling frequency.

Different physical embodiments have been developed which implement the MAC format of FIG. 2. For example, several MAC formats have been realized with a 3:2 luminance compression. European C,D and D/2 for 625 lines per frame system utilize a MAC sampling frequency of 20.250 MHz. B-MAC for both 625 and 525 lines per frame systems employ a MAC sampling frequency of 1365 $f_H$, where $f_H$ is the line scanning frequency. A further embodiment uses a MAC sampling frequency of 14.32 MHz with a 4:3 luminance compression and still another embodiment uses a MAC sampling frequency of 21.447 MHz with a 5:4 luminance compression.

Drawbacks to all of the above MAC embodiments include both limited luminance and chrominance resolution as well as complexity in the generation of the various clock frequencies in receivers. These drawbacks have been resolved in the physical embodiment shown below with reference to Table 1.

TABLE 1

| Signal | Frequency | Fraction of Master Clock |
|---|---|---|
| Master Clock ($f_0$) | 42.95 MHz = 2730 $f_H$ | 1 |
| Luminance Sampling ($f_1$) | 14.32 MHz = 910 $f_H$ | ⅓ |
| Chrominance Sampling ($f_2$) | 7.16 MHz = 455 $f_H$ | 1/6 |
| Audio Sampling ($f_3$) | 0.33 MHz = 21 $f_H$ | 1/130 |
| MAC ($f_4$) Sampling | 21.48 MHz = 1365 $f_H$ | ½ |
| Teletext Generator ($f_5$) | 6.14 MHz = 390 $f_H$ | 1/7 |
| NTSC Color Subcarrier | 3.579545 MHz = 227.5 $f_H$ | 1/12 |

(Frequency $f_3$ may also be 0.20 MHz, or 13 $f_H$, which is 1/210 of $f_0$.)

The system incorporating the embodiment shown in Table 1 is discussed in detail in application Ser. No. 652,926 filed Sept. 21, 1984 now U.S. Pat. No. 4,652,903, issued to K. Lucas. The Lucas patent is commonly assigned to the assignee of the present invention, and is herein incorporated by reference.

The Lucas embodiment incorporates frequencies (to be used as sampling frequencies and for other purposes) related to each other such that they can be derived from a single master clock frequency, simply by division by integer values. Thus, as no frequency multiplication is involved (which would be required if a selected frequency was not divisible by an integer into the master clock frequency), only a single phase-locked loop is required. This feature simplifies and reduces the cost of the equipment required at the receiver.

The limitation on the upper frequency of information which can be carried without distortion due to aliasing is one-half (50%) the sampling frequency (i.e., the Nyquist rate). The requirement for an economically realizable set of filters in the receiver further reduces the useful bandwidth to approximately 40% of the sampling frequency. Thus, for the family of frequencies shown in Table 1, the luminance frequency response is limited to approximately 6 MHz, while the chrominance frequency response is limited to approximately 3 MHz.

Two of the aforementioned MAC embodiments have been reduced to commercial practice are described in documents to be published by the CCIR, an international body which studies the standardization of television signals for international program exchange. These embodiments are the 525 line B-MAC and 625 line B-MAC. C and D/2 MAC will soon be used in Europe for Direct Broadcast (via) Satellite. Receivers are presently in use in several countries for transmissions within the B-MAC standards and use in other countries is expected shortly. Because of the luminance sampling frequencies employed within these standards, these transmissions have inherently limited resolution as noted above. There is increasing interest in improved resolution with widescreen pictures and it is highly desirable to extend the performance of these MAC systems, as discussed above, to provide increased resolution for new receivers while retaining full compathbility with existing MAC receivers for an orderly transition to improved television (HDTV). These MAC embodiments already provide for both widescreen and standard aspect ratio picture transmission and display.

SUMMARY OF THE INVENTION

Accordingly, it is an object of the present invention to produce a series of frequencies which offer wider bandwidth capabilities than the prior art.

It is also an object of the present invention to produce a series of frequencies which increases the information carrying capacity while retaining full compatibility with B-MAC, C-MAC, D-MAC or D/2-MAC formats at each respective frequency.

In accordance with these and other objects of the present invention, the series of frequencies are calculated using the following criteria:

(1) All frequencies are to be generated by integer division from a sensibly realizable master clock;

(2) The absolute frequencies of the master clock, the MAC sampling clock, the luminance sampling clock and the chrominance sampling clock may increase, but the absolute frequencies of the audio and data sampling clocks should not be changed;

(3) Generating 227.5 $f_H$ by integer division from the master clock;

(4) Generating a Teletext clock close to 6 MHz by integer division from the master clock; and (5) The chrominance sampling frequency, and therefore the luminance sampling frequency, must be an integer multiple of 455/4 $f_H$ (the reciprocal of the minimum scrambling increment).

The series of frequencies selected as part of the present invention are related to each other in the following manner for B-MAC (the frequencies are defined in terms of $f_H$, thereby describing both 525 and 625 line systems):

$$f_0 = 3f_1 = 6f_2 = 2f_4 = 13265kf_H$$

where:
  $f_0$ is the master clock frequency;
  $f_1$ is the luminance sampling frequency;
  $f_2$ is the chrominance sampling frequency;
  $f_4$ is the MAC sampling frequency;
  $f_H$ is the horizontal line frequency; and
  k is a positive integer greater then 2.

For C, D, and D/2-MAC systems, the realtionship becomes:

$$f_0 = 3f_1 = 6f_2 = 2f_4 = 1296kf_H$$

I have found that the criteria listed above, as well as full compatibility with the Lucas embodiment (B-MAC) and the C, D, and D/2-MAC embodiments, are satisifed with a series of frequencies in which $f_o$ increases at the rates shown above 1365 $f_H$ for BMAC and 1296 $f_H$ for C, D, and D/2-MAC. Additionally, given a value of k equal to 3, a 50% increase in both luminance and chrominance bandwidth is available. Similar increases in bandwidth are available for consecutive increases in the value of k.

Since audio information will accompany the composite color television signal which is ultimately delivered to the receiver, audio samples are included in the MAC color television signal. Therefore, the audio sample frequency ($f_3$) is also selected to be evenly divisible into the master clock frequency.

If the teletext is desired, a signal near 6 MHz must be generated at the receiver to allow the use of standard "dot-matrix" teletext character generators. Once again, the teletext sampling frequency ($f_5$) should be evenly divisible into the master clock frequency.

The invention is implemented in a centrally-located encoder, which converts a color television signal, including luminance and chrominance into a MAC color television signal, and a decoder at each receiver, which converts the MAC color television signal to a composite color television signal. The signal may then be transmitted over the greater part of its transmission path in the more advantageous MAC format.

The encoder receives a television signal comprising separate luminance and chrominance components. These components are sampled, in a known manner, at the appropriate (luminance or chrominance) sampling frequency. Luminance samples are compressed in the ratio of 3:2 by writing them into a store at $f_1$ (the luminance sampling frequency) and reading them from the store at $f_4$ (the MAC sampling frequency). Chrominance samples are compressed in the ratio of 3:1 by reading them into a store at $f_2$ (the chrominance sampling frequency) and reading them from the store at $f_4$. The samples are read alternately from the stores (and combined with any other desired signals, such as audio samples) by a multiplexer to produce the MAC color television signal, which is transmitted to each receiver.

At each receiver, the decoder includes a demultiplexer which separates the several components from the MAC signal. Luminance and chrominance are decompressed by reversing the process by which they were compressed. Audio or other information is also recovered.

In the case of B-MAC, 525 lines/picture, chrominance samples are used in a known manner to modulate the 227.5 $f_H$ NTSC color subcarrier generated in the decoder. The decompressed luminance samples and modulated subcarrier are then combined with appropriate synchronization and blanking information into composite NTSC color television signals. In a similar manner, B-MAC 625 lines/picture can be transcoded into PAL.

Within the HBI, several audio channels may be transmitted using time-division multiplexing. Also, teletext information may be transmitted in the vertical blanking interval (VBI) in a manner well known in the art. Teletext codes are recovered in the receiver and input to a character generator which produces the alphanumeric characters for display on the television screen.

It is fundamental to this invention to note that a MAC receiver built for the present MAC standards has signal processing circuits and clock frequencies which can process improved MAC signals to be transmitted with inherently higher resolution by the technique of this invention. Different values of k (a positive integer greater than 2) can be used at the studio to encode higher resolution MAC video. New systems would retain the present standard values of data clock frequencies. Thus, the new MAC receiver and present MAC receiver decode data in the same basic way, but the new MAC receiver, in order to obtain the additional resolution of the new MAC signal transmissions, will have an appropriately wider bandwidth filter preceding the A/D converter, and will employ a set of video processing clock frequencies simply and appropriately related to the standard MAC clock frequencies, i.e., an increase in these clock frequencies of either 3:2 for which k=3, or 4:2 for which k=4. The existing MAC receiver, or receivers designed to the existing standards may be considered as members of a family in which k=2 and for which, luminance bandwidth can be about 6 MHz. Members of the family in which k=3 can realize 9 MHz bandwidth and members where k=4 can realize 12 MHz bandwidth. According to this invention, any receiver designed as a member of a family having any of these values of k can receive transmissions which were encoded with any other positive integer value of k, i.e., 2,3 or 4. Therefore, in the further, as more powerful spacecraft transponders become available, or as terrestrial transmission of MAC signals begins, and the encoding takes place with k>2, for example 3 or 4, receivers designed for a lower value of k will be able to receive picture and sound. Such receivers whether encoded K=2, k=3, or k=4 can in general recover a bandwidth in MHz=3*k of the receiver. The aforementioned commercially implemented MAC systems have a value of k=2 and realize a 6 MHz bandwidth. An improved MAC system with k=3 in the receiver can yield a 9 MHz bandwidth if transmissions are at the k=3 or k<4 level. Conversely, a receiver designed in accordance with this invention for k=3 or k=4 would provide 6 MHz bandwidth for k=2 transmissions and 9 MHz for k=3 transmissions and 12 MHz for k=4 in both transmission and the receiver. A receiver designed for k=4, would provide 6 MHz bandwidth when receiving transmissions encoded at k=2 and 9 MHz for signal encoded at k=3, while providing 12 MHz bandwidth when receiving transmissions in which k=4. While receivers designed for the wider bandwidths possible (k=3) would have wider bandwidth filters, they may also be equipped with filters appropriate for standard MAC (k=2). Such filters will improve signal-to-noise ratio, and hence picture quality.

It is this future extensibility which underlies the present invention. Fundamental to this invention is the retention of the present data sampling frequencies in any new system. If the present systems are defined for k=2, their data rates are independent of k and must remain at their presently selected values where k>2.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein:

FIG. 1 is an amplitude-vs.-frequency diagram illustrating in simplified form a typical NTSC color television signal.

FIG. 2 is is an amplitude-vs.-time diagram of a single video line of a typically MAC color television signal.

DETAILED DESCRIPTION OF THE PREFERRED EMBODIMENT

Figure 3:
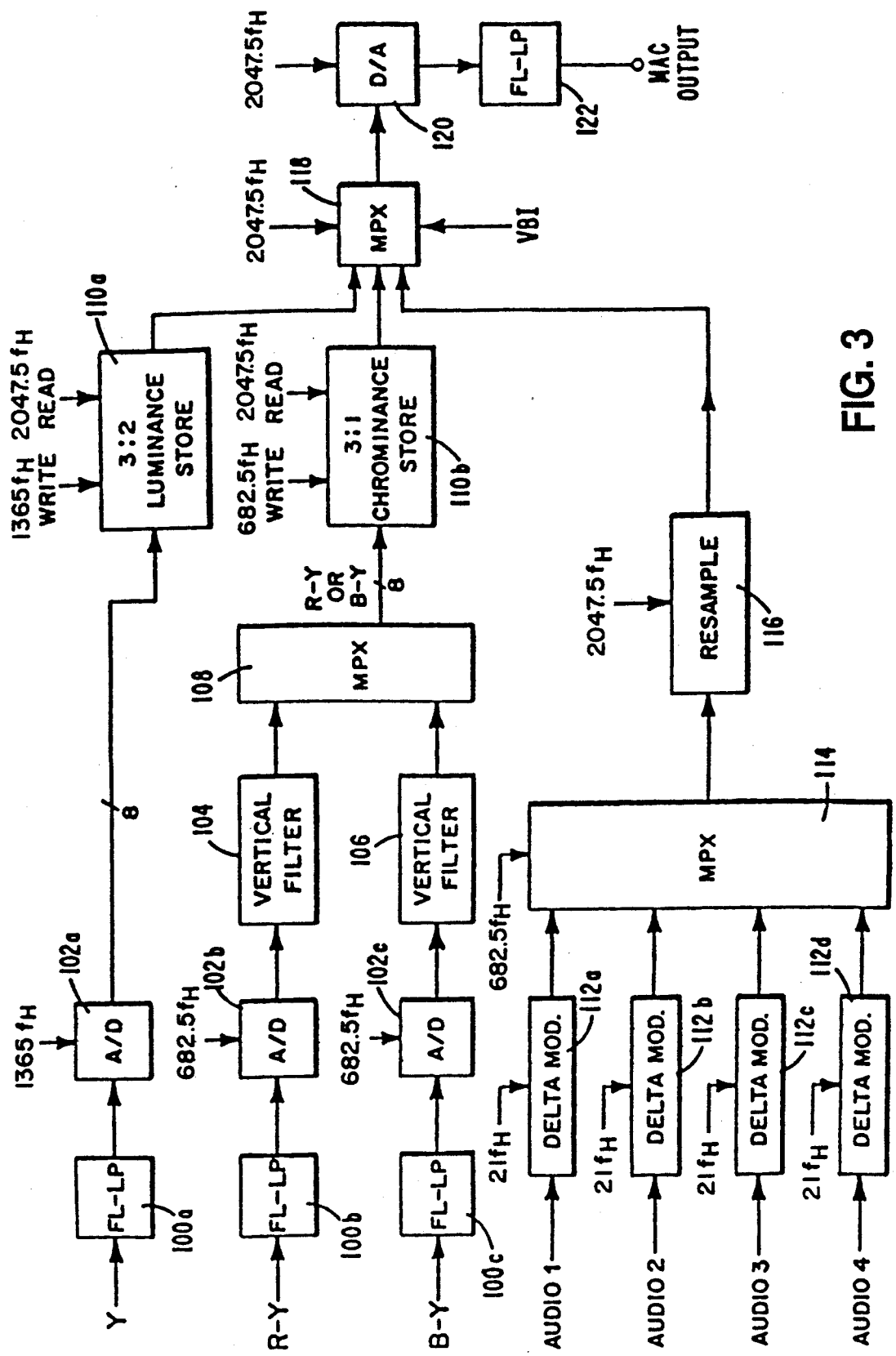
FIG. 3 is a diagram of the encoder used with the present invention as applied to a B-MAC for k=3.

The preferred embodiment of the present invention is illustrated using the NTSC color subcarrier where the received MAC signal at the receiver is converted to an NTSC signal. However, it is to be noted that the present invention is equally applicable to both PAL and SECAM systems, their respective implementation being readily obvious to those skilled in the art based on the description contained herein.

Table 2 gives the frequencies selected for use with the preferred embodiment of the present invention, wherein the value of k is chosen to be 3. (The frequencies shown in Table 2 are listed as multiples of $f_H$ so that both 525 and 625 line system are described)

TABLE 2

[FRACTION OF MASTER CLOCK IN PARENTHESES]

| Signal | Frequency (B-MAC) | Frequency (C, D-MAC) | Frequency (D/2-MAC) |
|---|---|---|---|
| Master clock ($f_0$) | 4095 $f_H$ (1) | 3888 $f_H$ (1) | 3888 $f_H$ (1) |
| Luminance Sampling ($f_1$) | 1365 $f_H$ (⅓) | 1296 $f_H$ (⅓) | 1296 $f_H$ (⅓) |
| Chrominance Sampling ($f_2$) | 682.5 $f_H$ (1/6) | 648 $f_H$ (1/6) | 648 $f_H$ (1/6) |
| Audio Sampling ($f_3$) | 21 $f_H$ (1/195) | 1296 $f_H$ (⅓) | 648 $f_H$ (1/6) |
| MAC Sampling ($f_4$) | 2047.5 $f_H$ (½) | 1944 $f_H$ (½) | 1944 $f_H$ (½) |
| Teletext Generator ($f_5$) | 409.5 $f_H$ (1/10) | — | — |
| NTSC Color | 227.5 $f_H$ (1/18) | — | — |

TABLE 2-continued
[FRACTION OF MASTER CLOCK IN PARENTHESES]

| Signal | Frequency (B-MAC) | Frequency (C, D-MAC) | Frequency (D/2-MAC) |
|---|---|---|---|
| Subcarrier | | | |

Thus, the present invention may be generalized beyond the Lucas embodiment (B-MAC) to include, by way of example and not limited thereto, these European MAC embodiments. An alternative audio sampling frequency for B-MAC is 13 $f_H$, or 1/315 of the master clock frequency. At 21 $f_H$, four audio channels are available; at 13 $f_H$, six audio channels are available. In the preferred embodiment, the chrominance, MAC and teletext clocks are reset once per line, during horizontal blanking.

AS shown by the family of frequencies in Table 2, a 50% increase in both luminance and chrominance bandwidth is achieved over the frequencies used in the Lucas embodiment as shown with reference to Table 1. Similar increases in bandwidth are available for consecutive increases of 1365 $f_H$ in the master clock frequency. For example, with reference to Table 3, below, a 100% increase in both luminance and chrominance bandwidth is achieved with respect to the frequencies of Table 1.

TABLE 3
[FRACTION OF MASTER CLOCK IN PARENTHESES]

| Signal | Frequency (B-MAC) | Frequency (C, D-MAC) | Frequency (D/2-MAC) |
|---|---|---|---|
| Master clock ($f_0$) | 5460 $f_H$ (1) | 5184 $f_H$ (1) | 5184 $f_H$ (1) |
| Luminance Sampling ($f_1$) | 1820 $f_H$ (⅓) | 1728 $f_H$ (⅓) | 1728 $f_H$ (⅓) |
| Chrominance Sampling ($f_2$) | 910 $f_H$ (1/6) | 864 $f_H$ (1/6) | 864 $f_H$ (1/6) |
| Audio Sampling ($f_3$) | 21 $f_H$ (1/260) | 1296 $f_H$ (¼) | 648 $f_H$ (⅛) |
| MAC Sampling ($f_4$) | 2730 $f_H$ (½) | 2592 $f_H$ (½) | 2592 $f_H$ (½) |
| Teletext Generator ($f_5$) | 390 $f_H$ (1/14) | — | — |
| NTSC Color Subcarrier | 227.5 $f_H$ (1/24) | — | — |

As above, an alternative audio sampling frequency is 13 $f_H$, or 1/420 of the master clock frequency for B-MAC.

FIG. 3 is a block diagram of the encoder used with the present invention (i.e., Table 2). Three color television signals, luminance (Y) and two color difference signals (R−Y and B−Y) are delivered from a conventional color television source and are filtered, respectively, in low-pass filters 100a, 100b and 100c. The filtered color television signals are then sampled at the appropriate rate (for example, 1365 $f_H$ for luminance and 682.5 $f_H$ for each of the chrominance signals for B-MAC where k=3) in A/D converters 102a, 102b, and 102c.

Vertical filters 104 and 106 provide vertical interpolation of the digital color difference signals R−Y and B−Y, respectively, after which these signals are selected alternately for transmission by multiplexer 108. Unlike NTSC television transmission, only one of the two color difference signals is sent as chrominance in each line of MAC television.

The digital luminance and chrominance signals are next compressed as described above. Luminance data are written into luminance store 110a at 1365 $f_H$, the luminance sampling frequency, and read from the store at 2047.5 $f_H$, the MAC sampling frequency. Chrominance data are written into chrominance store 110b at 682.5 $f_H$, the chrominance sampling frequency, and read from the store at 2047.5 $f_H$.

During the time when color television signals are being processed, the accompanying audio information is also sampled and compressed for transmission. In the case of B-MAC, four audio channels, 1 through 4, are sampled and digitized at 21 $f_H$ in delta modulators 112a–112d. The four channels of delta-modulated audio are then alternately selected for transmission, and compressed to 910 $f_H$, by multiplexer 114. After compression, the audio is resampled at the MAC sampling frequency in sampling circuit 116. Different audio schemes are specific to C-MAC and others to D- and D/2-MAC. The details of the B-MAC audio scheme are given only by way of example.

The information transmitted in the VBI, synchronization, timing, and teletext, is represented in FIG. 3 by the arrow labelled "VBI." This information is generated in a conventional manner and delivered to multiplexer 118 at the MAC sampling frequency.

Multiplexer 118 received four sets of signals, luminance, chrominance, audio, and synchronization, timing and teletext, all occurring at the MAC sampling frequency. Multiplexer 118 then combines these signals by selecting them at the appropriate time for inclusion in the MAC video line. After multiplexing, the signals are reconverted to analog in D/A converter 120, filtered in low-pass filter 122, and output as a MAC color television signal.

Figure 4:
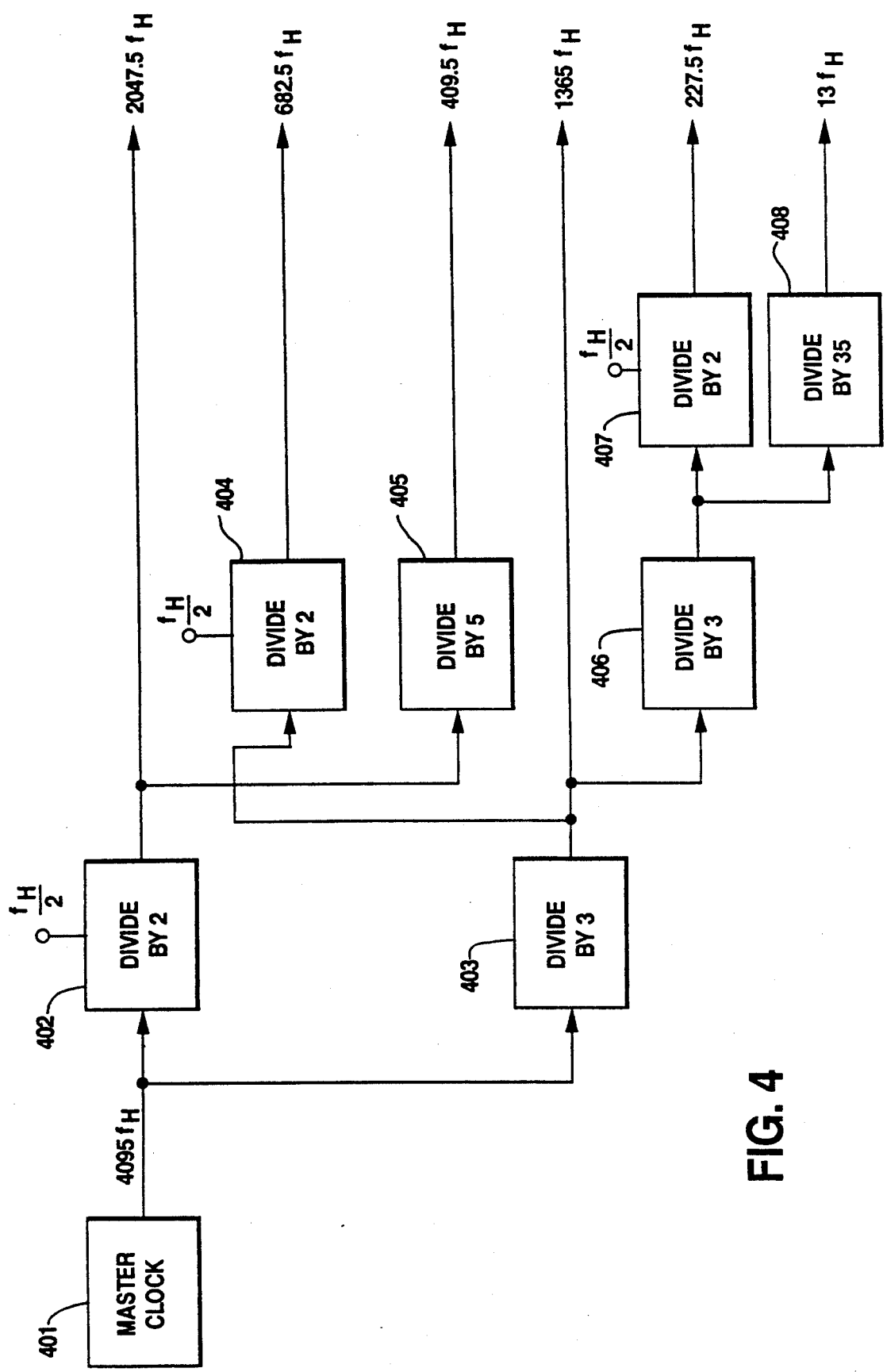
FIG. 4 is a diagram of the circuitry used to generate the various frequencies required in both the encoder and the decoder of a B-MAC systems.

FIG. 4 is a block diagram of the circuitry which could be used to generate the various frequencies required in both the encoder and the decoder. Master clock 401 includes a phase-locked loop and generates the master clock signal at 4095 $f_H$. This signal is sent to two dividers. Divider 402 divides the master clock signal by 2, producing the MAC sampling frequency, which is used by dividers 404 and 405 to produce the chrominance and teletext sampling frequencies, respectively. Divider 402 is reset by $f_{H/2}$ pulses during alternate horizontal blanking intervals so that luminance samples are orthogonal (vertically aligned). Divider 404 is clocked at 1365 $f_H$ and is reset by $f_{H/2}$ pulses as above for orthogonal chrominance sampling.

Those clock frequencies which are fractional in $f_H$ are obtained by a divide by two divider (see FIG. 4) and such a divider must be reset by a $f_{H/2}$ pulse during horizontal blanking. The rest function must be applied to the same horizontal blanking pulses in both encoder and decoder. This may be accomplished by adopting a simple protocol. For instance, during those horizontal blanking intervals which preceed even numbered active lines, the reset pulse shall execute the reset operation of binary counters 404, and 407 of FIG. 4. Circuitry exists in MAC decoders to identify such odd and even numbered lines as there already exists such a protocol for line sequential transmission of R−Y, B−Y. The master clock signal is also sent to divider 403, producing the luminance sampling frequency, which is sued by dividers 407 and 408 (via divider 406) to produce the NTSC color subcarrier for the 525 line B-MAC and the audio sampling frequencies, respectively. Other arrangements, however, will be readily apparent to those skilled in the art.

Figure 5:
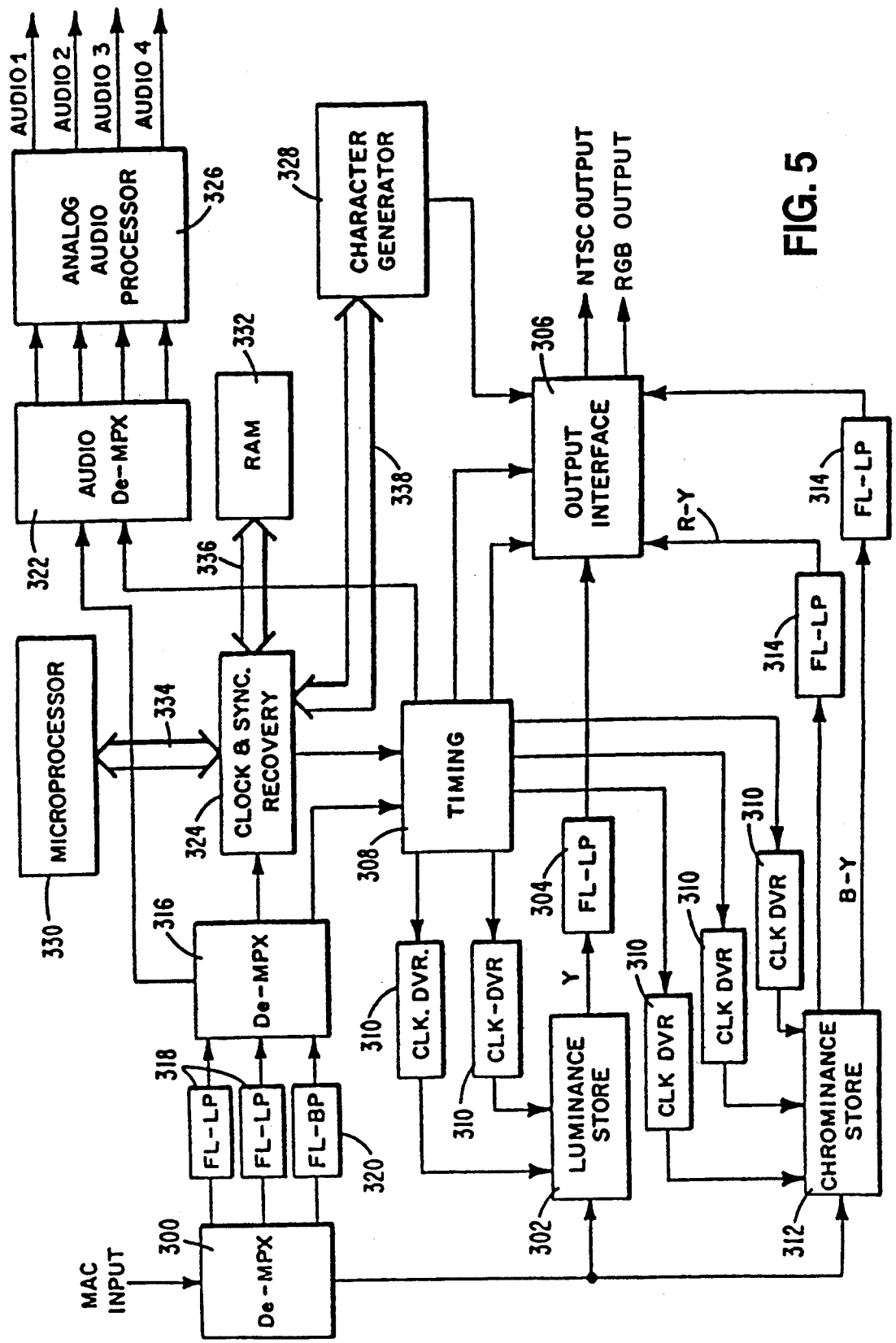
FIG. 5 is a diagram of the decoder used with the present invention as applied to a 525 line B-MAC.

FIG. 5 is a block diagram of the decoder used with the present invention. The MAC television signal first enters the demultiplexer 300, which separates from it the luminance and chrominance signals as well as the audio, synchronization, timing and teletext information. The luminance signal is delivered to luminance store 302 where it is decompressed, and then to low-pass filter 304, where it is filtered. The analog luminance signal then goes to output interface 306. The sampling signals necessary to decompress luminance are produced in timing generator 308 and supplied to luminance store 302 by two clock drivers 310.

The chrominance signal from demultiplexer 300 is also decompressed in chrominance store 312. Separate outputs are provided for the two color difference signals, which are filtered in two low-pass filters 314 and then supplied to output interface 306. The necessary sampling signals are supplied to chrominance store 312 from timing generator 308 through three clock drivers 310.

Signals not constituting luminance or chrominance are also separated from the MAC television signal by demultiplexer 300. These signals include audio, teletext and synchronization and timing information. Audio, teletext, and synchronization signals are delivered to demultiplexer 316 through one of two low-pass filters 318, while the fixed-frequency timing information is delivered to demultiplexer 316 through band-pass filter 320. Demultiplexer 316 separates these signals, supplying the audio to audio demultiplexer 322 and the synchronization and timing signals to clock and synchronization recovery circuit 324 and timing generator 308. Audio information from demultiplexer 316 is separated into four channels in audio demultiplexer 322 and output by analog audio processor 326. Teletext information is sent to character generator 328 via clock and synchronization recovery circuitry 324. Decoder operations are under the control of microprocessor 330, which communicates with clock and synchronization recovery circuit 324, teletext character generator 328, and RAM 332 over bi-directional buses 334, 338 and 336, respectively.

Output interface 306 receives teletext characters from character generator 328, luminance from low-pass filter 304, chrominance from low-pass filters 314, and timing signals from timing generator 308. Its output is a standard NTSC color television signal for the 525 line B-MAC and a standard RBG (red, green and blue) color television signal.

Figure 6:
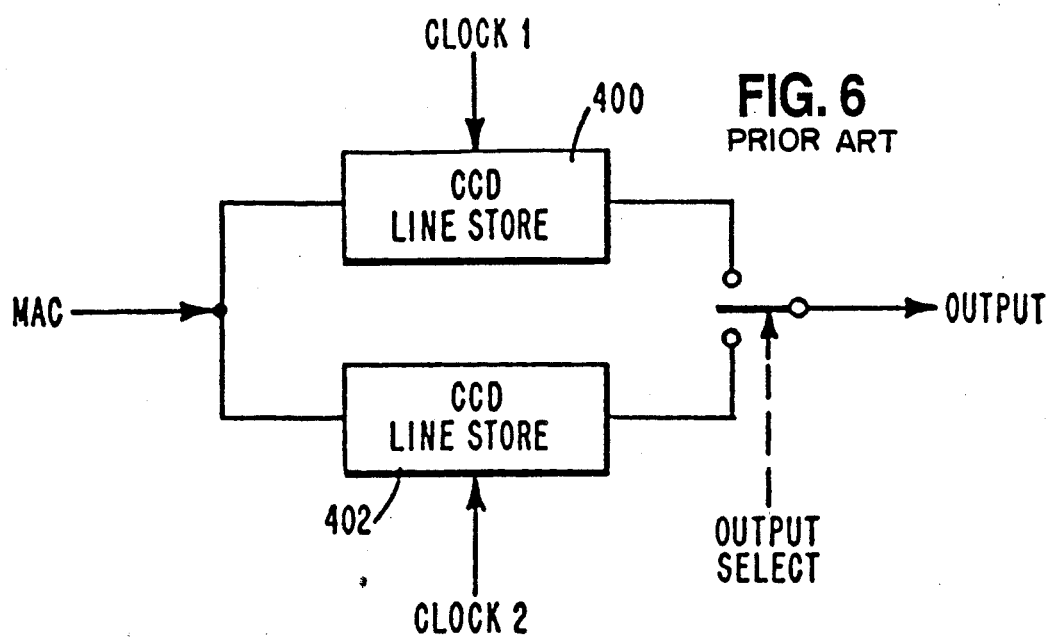
FIG. 6 is a diagram of a line store which may be used to compress or decompress luminance or chrominance samples.
Figure 7:
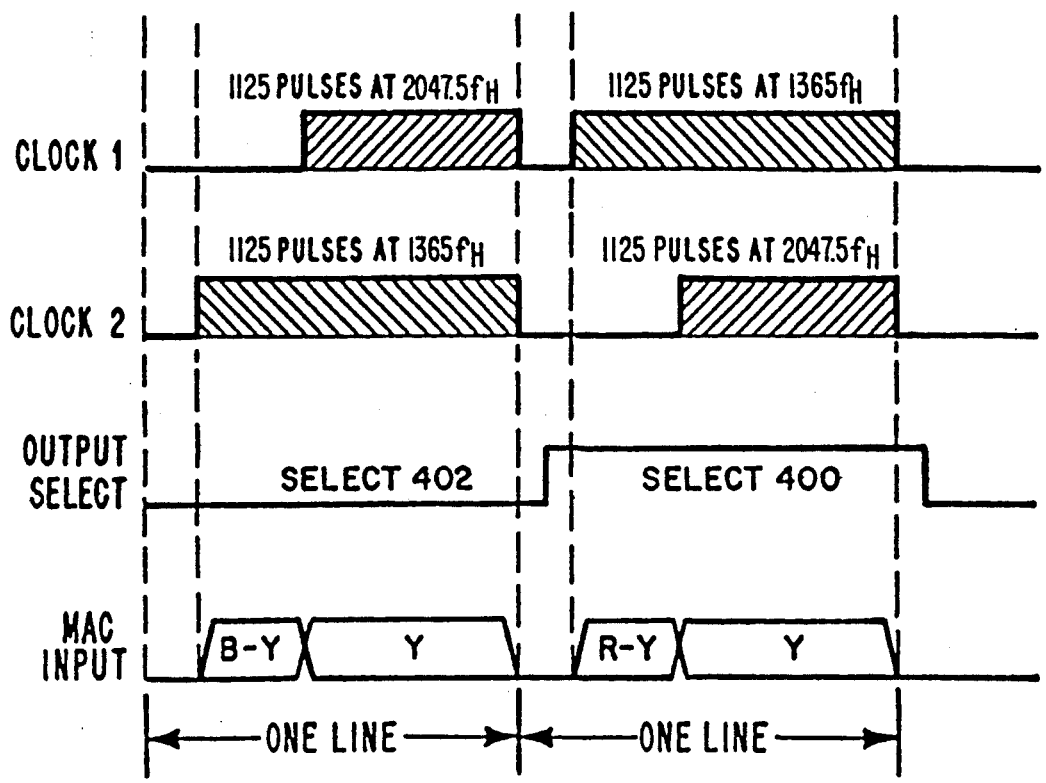
Fig. 7 is a diagram directed to a B-MAC illustrating the signals input to and output from the line store of FIG. 6 during a luminance decompression operation.

FIG. 6 is a diagram of a line store which may be used to compress or decompress luminance or chrominance. This line store is representative of storage devices 110a and 110b in FIG. 3 and 302 and 312 in FIG. 5. The line store is described as performing luminance decompression. FIG. 7 is a diagram illustrating the signals input to and output from the line store of FIG. 6 during the luminance decompression operation. The figures in parentheses are for the C or D/2-MAC embodiments. As the MAC television signal arrives, clock 1 writes the 1,125 (1044) luminance samples into line store 400 at the MAC sampling frequency of 2047.5 (1944)$f_H$. At the same time, clock 2 is causing the contents of line store 402 to be read onto the output line at the rate of 1365 (1296)$f_H$. During the next video line, the 1,125 (1044) luminance samples are written into line store 402 by clock 2, operation at 2047.5 (1944)$f_H$. At the same time, the luminance samples stored in line store 400 are read to be the output line by clock 1, at 1365 (1296)$f_H$. A similar operation is used to decompress the chrominance samples, the clocks there alternating between 2047.5 (1944)$f_H$ and 682.5 (648)$f_H$.

Although illustrative embodiments of the present invention have been described in detail with reference to the accompanying drawings, it is to be understood that the invention is not limited to these precise embodiments. Various changes and modifications may be effected therein by one skilled in the art without departing from the scope or spirit of the invention.

I claim:

1. An encoder to convert a television signal including luminance and chrominance information and accompanied by data information to a B-MAC television signal for further conversion by a decoder to a composite television signal, said encoder comprising:

sampling means for sampling the luminance information at a frequency $f_1$, sampling the chrominance information at a frequency $f_2$ and sampling the data information at a frequency $f_3$;

compression means for changing the frequency of the luminance and chrominance samples to a frequency $f_4$ and for changing the frequency of the data samples;

multiplex means for combining the compressed luminance and chrominance samples and the data samples into the B-MAC television signal;

a master clock to generate a master clock signal having a frequency $f_0$; and dividing means for supplying to said sampling means and said compression means signals at frequencies $f_1$, $f_2$, $f_3$, $f_4$, derived from the master clock signal; wherein $$f_0 = 3f_1 = 6f_2 = 2f_4 = 1365 \, k \, f_h,$$

where k is a positive integer greater than 2 and $f_3$ is a predetermined constant frequency independent of k.

2. An encoder to convert a television signal including luminance and chrominance information and accompanied by data information to a C-, D-, or D/2-MAC television signal for further conversion by a decoder to a composite television signal, said encoder comprising:

sampling means for sampling the luminance information at a frequency $f_1$, sampling the chrominance information at a frequency $f_2$ and sampling the data information at a frequency $f_3$;

compression means for changing the frequency of the luminance and chrominance samples to a frequency $f_4$ pl and for changing the frequency of the data samples;

multiplex means for combining the compressed luminance and chrominance samples and the data sample into the C-, D-, d/2-MAC television signal;

a master clock to generate a master clock signal having a frequency $f_0$; and dividing means for supplying to said sampling means and said compression means signals at frequencies $f_1, f_2, f_3, f_4$, derived from the master clock signal; where $$f_0 = 3f_1 = 6f_2 = 2f_4 = 1296 \, k \, f_h,$$

where k is a positive integer greater than 2 and $f_3$ is a predetermined constant frequency independent of k.

3. An encoder as claimed in claim 1 or claim 2 wherein k=3.

4. An encoder as claimed in claim 1 or claim 2 wherein k=4.

5. An encoder as claimed in claim 1 wherein the television signal is accompanied by audio information, said sampling means sample the audio information at a frequency $f_3$, said compression means changes the frequency of the audio samples, and said multiplex means combines the compressed audio samples into the B-MAC television signal, said dividing means supplying to said sampling means a signal derived from the master clock signal at frequency $f_3$ where $$f_3 = 13 f_H.$$

6. An encoder as claimed in claim 1 wherein the television signal is accompanied by audio information, said sampling means samples the audio information at a frequency $f_3$, said compression means changes the frequency of the audio samples, and said multiplex means combines the compressed audio samples into the B-MAC television signal, said dividing means supplying to said sampling means a signal derived from the master clock signal at frequency $f_3$ where $$f_3 = 21 f_H.$$

7. An encoder as claimed in claim 2 wherein the television signal is accompanied by audio information, said sampling means samples the audio information at a frequency $f_3$, said compression means changes the frequency of the audio samples, and said multiplex means combines the compressed audio sample into the C-or D-MAC television signal, said dividing means supplying to said sampling means a signal derived from the master clock signal at frequency $f_3$ where $$f_3 = 1296 f_H.$$

8. An encoder as claimed in claim 2 wherein the television signal is accompanied by audio information, said sampling means samples the audio information at a frequency $f_3$, said compression means changes the frequency of the audio samples, and said multiplex means combines the compressed audio sample into the D/2-MAC television signal, said dividing means supplying to said sampling means a signal derived from the master clock signal at frequency $f_3$ where $$f_3 = 648 f_H.$$

9. An encoder as claimed in claim 1 wherein
$f_0 = 4095 f_H$,
$f_1 = 1365 f_H$,
$f_2 = 682.5 f_H$,
$f_4 = 2047.5 f_H$.

10. An encoder as claimed in claim 2 wherein
$f_0 = 3888 f_H$,
$f_1 = 1296 f_H$,
$f_2 = 648 f_H$,
$f_4 = 1944 f_H$.

11. An encoder as claimed in claim 1 wherein
$f_0 = 5460 f_H$,
$f_1 = 1820 f_H$,
$f_2 = 910 f_H$,
$f_4 = 2730 f_H$.

12. An encoder as claimed in claim 2 wherein
$f_0 = 5148 f_H$,
$f_1 = 1728 f_H$,
$f_2 = 864 f_H$,
$f_4 = 2592 f_H$.

13. A decoder to convert a 525 line B-MAC television signal, having luminance and chrominance samples occurring at a frequency $f_4$ and having data samples, to a composite television signal, said decoder comprising:
demultiplexer means for separating the luminance, chrominance and data samples from the B-MAC television signal;
decompression means for changing the frequency of the separated luminance samples to a frequency $f_1$, changing the frequency of the separated chrominance samples to a frequency $f_2$, and changing the frequency of the separated data samples to a frequency $f_3$;
color modulator means for modulating a subcarrier with the decompressed chrominance samples;
output means for combining the decompressed luminance samples and the modulated subcarrier into the composite television signal and for outputting the decompressed data samples to accompany the composite television signal;
a master clock to generate a master clock signal having a frequency $f_0$; and
dividing means for supplying to said decompression means and said color modulator means signals at frequencies $f_1$, $f_2$, $f_3$, $f_4$ derived from the master clock signal; wherein $$f_0 = 3f_1 = 6f_2 = 2f_4 = 1365 \, k \, f_h,$$

where k is a positive integer greater than 2 and $f_3$ is a predetermined constant frequency independent of k.

14. A decoder to convert a C, D, or D/2-MAC television signal, having luminance and chrominance samples occurring at a frequency $f_4$ and having data samples, to a composite television signal, said decoder comprising:
demultiplexer means for separating the luminance, chrominance and data samples from the C,D,D/2-MAC television signal;
decompression means for changing the frequency of the separated luminance samples to a frequency $f_1$, changing the frequency of the separated chrominance samples to a frequency $f_2$, and changing the frequency of the separated data samples to a frequency $f_3$;
color modulator means for modulating a subcarrier with the decompressed chrominance samples;
output means for combining the decompressed luminance samples and the modulated subcarrier into the composite television signal and for outputting the decompressed data samples to accompany the composite television signal;
a master clock to generate a master clock signal having a frequency $f_0$; and
dividing means for supplying to said decompression means and said color modulator means signal at frequencies $f_1$, $f_2$, $f_3$, $f_4$ derived from the master clock signal; wherein $$f_0 = 3f_1 = 6f_2 = 2f_4 = 1296 \, k \, f_h,$$

where k is a positive integer greater than 2 and $f_3$ is a predetermined constant frequency independent of k.

15. A decoder as claimed in claim 13 or claim 14 where k=3.

16. A decoder as claimed in claim 13 or claim 14 where k=4.

17. A decoder as claimed in claim 13 wherein the B-MAC television signal includes audio samples, said demultiplexer means separates the audio samples from the B-MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $$f_3 = 13 f_H.$$

18. A decoder as claimed in claim 13 wherein the B-MAC television signal includes audio samples, said demultiplexer means separates the audio samples from the B-MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $$f_3 = 21 f_H.$$

19. A decoder as claimed in claim 14 wherein the C- or D-MAC television signal includes audio samples, said demultiplexer means separates the audio samples from the C- or D-MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $$f_3 = 1296 f_H.$$

20. A decoder as claimed in claim 14 wherein the D/2-MAC television signal includes audio samples, said demultiplexer means separates the audio samples from the D/2-MAC television signal, said decompression means changes the frequency of the audio samples to a frequency $f_3$, and said output means outputs the decompressed audio samples to accompany the composite television signal, said dividing means supplying to said decompression means a signal derived from the master clock signal at a frequency $f_3$ where $$f_3 = 648 f_H.$$

21. A decoder as claimed in claim 13 wherein
$F_0 = 4095 f_H$,
$f_1 = 1365 f_H$,
$f_2 = 682.5 f_H$,
$f_4 = 2047.5 f_H$.

22. A decoder as claimed in claim 14 wherein
$f_0 = 3888 f_H$,
$f_1 = 1296 f_H$,
$f_2 = 648 f_H$,
$f_4 = 1944 f_H$.

23. A decoder as claimed in claim 13 wherein
$f_0 = 5460 f_H$,
$f_1 = 1820 f_H$,
$f_2 = 910 f_H$,
$f_4 = 2730 f_H$.

24. A decoder as claimed in claim 14 wherein
$f_0 = 5184 f_H$,
$f_1 = 1728 f_H$,
$f_2 = 864 f_H$,
$f_4 = 2592 f_H$.

25. A method for encoding and decoding a television signal including luminance and chrominance information and accompanied by audio information, the method having the old steps of encoding the television signal by sampling the luminance information at a frequency $f_1$, sampling the chrominance information at a frequency $f_2$, sampling the audio information at a frequency $f_3$, compressing the luminance and chrominance samples to a frequency $f_4$, compressing the audio samples, combining the luminance, chrominance, and audio samples into a Multiplexed Analog Component (MAC) television signal, and decoding the MAC television signal by separating the luminance, chrominance and audio samples from the MAC television signal, decompressing the luminance samples to a frequency $f_1$, decompressing the chrominance samples to a frequency $f_2$, decompressing the audio samples to a frequency $f_3$, modulating a subcarrier with the decompressed chrominance samples, combining the decompressed luminance samples and the modulated subcarrier into a composite television signal, and outputting the composite television signal accompanied by the decompressed audio samples, wherein the method further comprises the steps of:

encoding the television signal utilizing a first set of frequencies $f_1$, $f_2$, $f_4$:

decoding the television signal utilizing a second set of frequencies $f_1$, $f_2$, $f_4$ different than the first set of frequencies, wherein the television signal is encoded and decoded utilizing the same frequency $f_3$.

26. The method as claimed in claim 25 wherein frequencies $f_1$, $f_2$, $f_4$ are selected to satisfy the relationship $$3f_1 = 6f_2 = 2f_4 = 1365 \, k \, f_h,$$

where k is a positive integer greater than 2.

27. The method as claimed in claim 25 wherein frequencies $f_1$, $f_2$, $f_4$ are selected to satisfy the relationship $$3f_1 = 6f_2 = 2f_4 = 1296 \, k \, f_h,$$

where k is a positive integer greater than 2.

28. The method as claimed in claim 26 wherein $f_3 = 21 f_h$.

29. The method as claimed in claim 26 wherein $f_3 = 13 f_h$.

30. The method as claimed in claim 27 wherein $f_3 = 648 f_h$.

31. The method as claimed in claim 27 wherein $f_3 = 1296 f_h$.

32. A communication system for transmitting television signals including luminance and chrominance information and accompanied by audio information, the communication system having at least one encoder to convert a television signal to a Multiplexed Analog Component (MAC) television signal and a plurality of decoders for converting a MAC television signal to a composite television signal, said encoders comprising sampling means for sampling the luminance information at a frequency $f_1$, the chrominance information at a frequency $f_2$, and the audio information at a frequency $f_3$, compression means for changing the frequency of the luminance and chrominance samples to a frequency $f_4$ and for changing the frequency of the audio samples, multiplex means for combining the compressed luminance and chrominance samples and the audio sample into a Multiplexed Analog Component (MAC) television signal, and said decoders comprising demultiplexer means for separating the luminance, chrominance, and data samples from the MAC television signal, decompression means for changing the frequency of the separated luminance samples to a frequency $f_1$, changing the frequency of the separated chrominance samples to a frequency $f_2$, and changing the frequency of the separated data samples to a frequency $f_3$, color modulator means for modulating a subcarrier with the decompressed chrominance samples, and output means for combining the decompressed luminance samples and the modulated subcarrier into the composite television signal and for outputting the decompressed data samples to accompany the composite television signal, said communication system including a first decoder utilizing a first set of frequencies $f_1$, $f_2$, $f_4$ and a second decoder utilizing a second set of frequencies $f_1$, $f_2$, $f_4$, both said first decoder and said second decoder utilizing the same frequency $f_3$.

33. The communication system in accordance with claim 32 wherein frequencies $f_1$, $f_2$, and $f_4$ are determined according to the relationship $$3f_1 = 6f_2 = 2f_4 = 1365\ k\ f_h,$$

where k is a positive integer greater than 2 and said first decoder utilizes frequencies $f_1$, $f_2$, $f_4$ determined by a first value of k and said second decoder utilizes frequencies $f_1$, $f_2$, $f_4$ determined by a second value of k different than the first value of k.

34. The communication system in accordance with claim 32 wherein frequencies $f_1$, $f_2$, and $f_4$ are determined according to the relationship $$3f_1 = 6f_2 = 2f_4 = 1296\ k\ f_h,$$

where k is a positive integer greater than 2 and said first decoder utilizes frequencies $f_1$, $f_2$, $f_4$ determined by a first value of k and said second decoder utilizes frequencies $f_1$, $f_2$, $f_4$ determined by a second value of k different than the first value of k.

35. The communication system as claimed in claim 33 wherein $f_3 = 21 f_h$.

36. The communication system as claimed in claim 33 wherein $f_3 = 13 f_h$.

37. The communication system as claimed in claim 34 wherein $f_3 = 1296 f_h$.

38. The communication system as claimed in claim 34 wherein $f_3 = 648 f_h$.

39. A communication system for transmitting television signals including luminance and chrominance information and accompanied by audio information, the communication system having a plurality of encoders to convert a television signal to a Multiplexed Analog Component (MAC) television signal and a plurality of decoders for converting a MAC television signal to a composite television signal, said encoders comprising sampling means for sampling the luminance information at a frequency $f_1$, the chrominance information at a frequency $f_2$, and the audio information at a frequency $f_3$, compression means for changing the frequency of the luminance and chrominance samples to a frequency $f_4$ and for changing the frequency of the audio samples, multiplex means for combining the compressed luminance and chrominance samples and the audio samples into a Multiplexed Analog Component (MAC) television signal, and said decoders comprising demultiplexer means for separating the luminance, chrominance, and audio samples from the MAC television signal, decompression means for changing the frequency of the separated luminance samples to a frequency $f_1$, changing the frequency of the separated chrominance samples to a frequency $f_2$, and changing the frequency of the separated audio samples to a frequency $f_3$, color modulator means for modulating a subcarrier with the decompressed chrominance samples, and output means for combining the decompressed luminance samples and the modulated subcarrier into the composite television signal and for outputting the decompressed audio samples to accompany the composite television signal, said communication system including a first encoder utilizing a first set of frequencies $f_1$, $f_2$, $f_4$ and a second encoder utilizing a second set of frequencies $f_1$, $f_2$, $f_4$, both said first encoder and said second encoder utilizing the same frequency $f_3$.

40. The communication system in accordance with claim 39 wherein frequencies $f_1$, $f_2$, and $f_4$ are determined according to the relationship $$3f_1 = 6f_2 = 2f_4 = 1365\ k\ f_h,$$

where k is a positive integer greater than 2 and said first encoder utilizes frequencies $f_1$, $f_2$, $f_4$ determined by a first value of k and said second encoder utilizes frequencies $f_1$, $f_2$, $f_4$ determined by a second value of k different than the first value of k.

41. The communication system in accordance with claim 39 wherein frequencies $f_1$, $f_2$, and $f_4$ are determined according to the relationship $$3f_1 = 6f_2 = 2f_4 = 1296\ k\ f_h,$$

where k is a positive integer greater than 2 an said first encoder utilizes frequencies $f_1$, $f_2$, $f_4$ determined by a first value of k and said second encoder utilizes frequencies $f_1$, $f_2$, $f_4$ determined by a second value of k different than the first value of k.

42. The communication system as claimed in claim 40 wherein $f_3 = 21 f_h$.

43. The communication system as claimed in claim 40 wherein $f_3 = 13 f_h$.

44. The communication system as claimed in claim 41 wherein $f_3 = 1296 f_h$.

45. The communication system as claimed in claim 41 wherein $f_3 = 648 f_h$.

46. An encoder to convert a television signal including luminance and chrominance information and accompanied by audio information to a Multiplexed Analog Component (MAC) television signal for further conversion by a first decoder having a first luminance and chrominance bandwidth and a second decoder having a second luminance and chrominance bandwidth, said encoder comprising sampling means for sampling the luminance information at a frequency $f_1$, the chrominance information at a frequency $f_2$, and the audio information at a frequency $f_3$, compression means for changing the frequency of the luminance and chrominance samples to a frequency $f_4$ and for changing the frequency of the audio samples, multiplex means for combining the compressed luminance and chrominance samples and the audio samples into a Multiplexed Analog Component (MAC) television signal, and said first and second decoders each comprising demultiplexer means for separating the luminance, chrominance, and audio samples from the MAC television signal, decompression means for changing the frequency of the separated luminance samples to a frequency $f_1$, changing the frequency of the separated chrominance samples to a frequency $f_2$, and changing the frequency of the separated audio samples to a frequency $f_3$, color modulator means for modulating a subcarrier with the decompressed chrominance samples, and output means for combining the decompressed luminance samples and the modulated subcarrier into the composite television signal and for outputting the decompressed audio samples to accompany the composite television signal, said encoder utilizing a first set of frequencies $f_1$, $f_2$, $f_4$, said first decoder utilizing a second set of frequencies $f_1$, $f_2$, $f_4$ and said second decoder utilizing a third set of frequencies $f_1$, $f_2$, $f_4$ different than the second set of frequencies, wherein said encoder, said first decoder, and said second decoder each utilize the same frequency $f_3$.

47. The encoder in accordance with claim 46 wherein frequencies $f_1$, $f_2$ and $f_4$ are determined according to the relationship $$3f_1=6f_2=2f_4=1365\,k\,f_h,$$

where k is a positive integer greater than 2, said encoder utilizing frequencies $f_1$, $f_2$, $f_4$ determined by a first value of k, said first decoder utilizing frequencies $f_1$, $f_2$, $f_4$ determined by a second value of k and said second decoder utilizing frequencies $f_1$, $f_2$, $f_4$ determined by a third value of k different than the second value of k.

48. The encoder in accordance with claim 46 wherein frequencies $f_1$, $f_2$ and $f_4$ are determined according to the relationship $$3f_1=6f_2=2f_4=1296\,k\,f_h,$$

where k is a positive integer greater than 2, said encoder utilizing frequencies $f_1$, $f_2$, $f_4$ determined by a first value of k, said first decoder utilizing frequencies $f_1$, $f_2$, $f_4$ determined by a second value of k and said second decoder utilizing frequencies $f_1$, $f_2$, $f_4$ determined by a third value of k different than the second value of k.

49. The encoder in accordance with claim 47 wherein $f_3=21f_h$.

50. The encoder in accordance with claim 47 wherein $f_3=13f_h$.

51. The encoder in accordance with claim 48 wherein $f_3=648f_h$.

52. The encoder in accordance with claim 48 wherein $f_3=1296f_h$.

53. A decoder to convert a Multiplexed Analog Component (MAC) television signal, having luminance and chrominance samples occurring at a frequency $f_4$ and having audio samples, to a composite television signal, said decoder converting a MAC television signal from an encoder which comprises sampling means for sampling luminance information at a frequency $f_1$, chrominance information at a frequency $f_2$, and audio information at a frequency $f_3$, compression means for changing the frequency of the luminance and chrominance samples to a frequency $f_4$ and for changing the frequency of the audio samples, multiplex means for combining the compressed luminance and chrominance samples and the audio samples into a Multiplexed Analog Component (MAC) television signal, said decoder comprising demultiplexer means for separating the luminance, chrominance, and audio samples from the MAC television signal, decompression means for changing the frequency of the separated luminance samples to a frequency $f_1$, changing the frequency of the separated chrominance samples to a frequency $f_2$, and changing the frequency of the separated audio samples to a frequency $f_3$, color modulator means for modulating a subcarrier with the decompressed chrominance samples, and output means for combining the decompressed luminance samples and the modulated subcarrier into the composite television signal and for outputting the decompressed audio samples to accompany the composite television signal, said encoder utilizing a first set of frequencies $f_1$, $f_2$, $f_4$ and said decoder utilizing a second set of frequencies $f_1$, $f_2$, $f_4$ different than the first set of frequencies, wherein said encoder and said decoder utilize the same frequency $f_3$.

54. The decoder in accordance with claim 53 wherein frequencies $f_1$, $f_2$, $f_4$ are determined according to the relationship $$3f_1=6f_2=2f_4=1365\,k\,f_h,$$

where k is a positive integer greater than 2 and said encoder utilizes frequencies $f_1$, $f_2$, $f_4$ determined by a first value of k and said decoder utilizes frequencies $f_1$, $f_2$, $f_4$ determined by a second value of k different than the first value of k.

55. The decoder in accordance with claim 53 wherein frequencies $f_1$, $f_2$, $f_4$ are determined according to relationship $$3f_1=6f_2=2f_4=1296\,k\,f_h,$$

where k is a positive integer greater than 2 and said encoder utilizes frequencies $f_1$, $f_2$, $f_4$ determined by a first value of k and said decoder utilizes frequencies $f_1$, $f_2$, $f_4$ determined by a second value of k different than the first value of k.

56. The decoder in accordance with claim 54 wherein $f_3=21f_h$.

57. The decoder in accordance with claim 54 wherein $f_3=13f_h$.

58. The decoder in accordance with claim 55 wherein $f_3=648f_h$.

59. The decoder in accordance with claim 55 wherein $f_3=1296f_h$.

60. An encoder to convert a television signal including luminance and chrominance information and accompanied by audio information to a Multiplexed Analog Component (MAC) television signal for further conversion by a decoder, said encoder comprising sampling means for sampling the luminance information at a frequency $f_1$, the chrominance information at a frequency $f_2$, and the audio information at a frequency $f_3$, compression means for changing the frequency of the luminance and chrominance samples to a frequency $f_4$ and for changing the frequency of the audio samples, multiplex means for combining the compressed luminance and chrominance samples and the audio samples into a Multiplexed Analog Component (MAC) television signal, and said decoder comprising demultiplexer means for separating the luminance, chrominance, and audio samples from the MAC television signal, decompression means for changing the frequency of the separated luminance samples to a frequency $f_1$, changing the frequency of the separated chrominance samples to a frequency $f_2$, and changing the frequency of the separated audio samples to a frequency $f_3$, color modulator means for modulating a subcarrier with the decompressed chrominance samples, and output means for combining the decompressed luminance samples and the modulated subcarrier into the composite television signal and for outputting the decompressed audio samples to accompany the composite television signal, said encoder utilizing a first set of frequencies $f_1$, $f_2$, $f_4$ and said decoder utilizing a second set of frequencies $f_1$, $f_2$, $f_4$ different than the first set of frequencies, wherein said encoder and said decoder each utilize the same frequency $f_3$.

61. The encoder in accordance with claim 60 wherein frequencies $f_1$, $f_2$ and $f_4$ are determined according to the relationship $$3f_1 = 6f_2 = 2f_4 = 1365 \, k \, f_h,$$

where k is a positive integer greater than 2, said encoder utilizing frequencies $f_1$, $f_2$, $f_4$ determined by a first value of k and said decoder utilizing frequencies $f_1$, $f_2$, $f_4$ determined by a second value of k.

62. The encoder in accordance with claim 60 wherein frequencies $f_1$, $f_2$ and $f_4$ are determined according to the relationship $$3f_1 = 6f_2 = 2f_4 = 1296 \, k \, f_h,$$

where k is a positive integer greater than 2, said encoder utilizing frequencies $f_1$, $f_2$, $f_4$ determined by a first value of k and said decoder utilizing frequencies $f_1$, $f_2$, $f_4$ determined by a second value of k.

63. The encoder in accordance with claim 61 wherein $f_3 = 21 f_h$.

64. The encoder in accordance with claim 61 wherein $f_3 = 13 f_h$.

65. The encoder in accordance with claim 62 wherein $f_3 = 648 f_h$.

66. The encoder in accordance with claim 62 wherein $f_3 = 12969 f_h$.

* * * * *

UNITED STATES PATENT AND TRADEMARK OFFICE
CERTIFICATE OF CORRECTION

PATENT NO. : 4,994,899

DATED : February 19, 1991

INVENTOR(S) : Charles W. Rhodes

It is certified that error appears in the above-identified patent and that said Letters Patent is hereby corrected as shown below:

[56]  References Cited

U.S. PATENT DOCUMENTS

| Number | Date | Name | Class |
|---|---|---|---|
| 4,652,903 | 3/1987 | Lucas | 358/11 |
| 4,866,522 | 9/1989 | Beckley | 358/145 |
| 4,549,224 | 10/1985 | Nakamura et al. | 358/316 |
| 4,544,950 | 10/1985 | Tu | 358/143 |
| 4,516,150 | 5/1985 | Gurley | 358/13 |
| 4,514,760 | 4/1985 | Balaban et al. | 358/143 |
| 4,335,393 | 6/1982 | Pearson | 358/11 |
| 4,245,235 | 1/1981 | Poetsch | |
| 3,789,137 | 1/1974 | Neweil | |
| 3,781,463 | 12/1973 | Van den Bussche | |
| 3,571,494 | 3/1971 | Law | |

FOREIGN PATENT DOCUMENTS

| Number | Date | Country |
|---|---|---|
| GB 2,144,300A | 2/1985 | United Kingdom |
| GB 2,144,298A | 2/1985 | United Kingdom |
| EP 103,339A | 11/1985 | European |
| PCT WO 84/02442 | 6/1984 | |
| PCT WO 83/03942 | 3/1984 | |

UNITED STATES PATENT AND TRADEMARK OFFICE
CERTIFICATE OF CORRECTION

PATENT NO. : 4,994,899

DATED : February 19, 1991

INVENTOR(S) : Charles W. Rhodes

It is certified that error appears in the above-identified patent and that said Letters Patent is hereby corrected as shown below:

FOREIGN PATENT DOCUMENTS

| | | |
|---|---|---|
| GB 2,144,300A | 2/1985 | United Kingdom |
| GB 2,144,298A | 2/1985 | United Kingdom |
| EP 103,339A | 11/1985 | European |
| PCT WO 84/02442 | 6/1984 | |
| PCT WO 83/03942 | 3/1984 | |

OTHER PUBLICATIONS

Lucas, K., Ph.D. (IBA), Progress Report On Investigations Of Digital Yuv Chroma-Key.

A.A. Goldberg, R.H. McMann and J.P. Rossi, A Two Channel Compatible HDTV Broadcast System (July 29, 1983).

K. Lucas and M.D. Windram, Direct Television Broadcasts By Satellite Desirability Of A New Transmission Standard (September 1981), pp. 8-19.

T.S. Robson, O.B.E., Extended-Definition Television Service, pp. 488-492.

Signed and Sealed this

Twenty-sixth Day of January, 1993

*Attest:*

STEPHEN G. KUNIN

*Attesting Officer*   *Acting Commissioner of Patents and Trademarks*